July 25, 1961    S. G. GOESLE    2,993,287
WIND ANIMATED SIGN
Filed Sept. 24, 1959
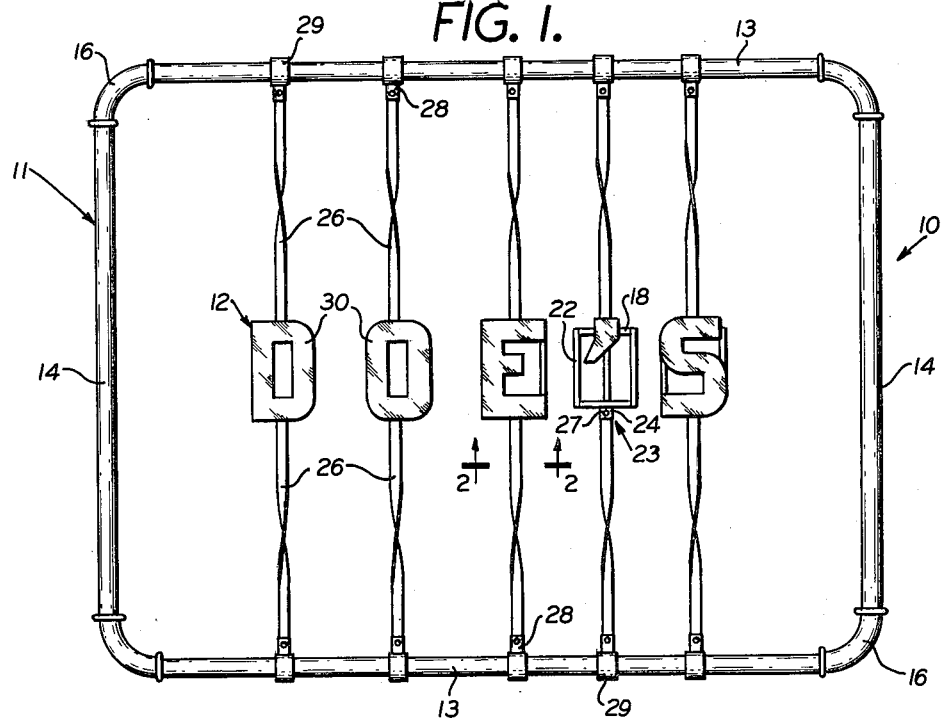
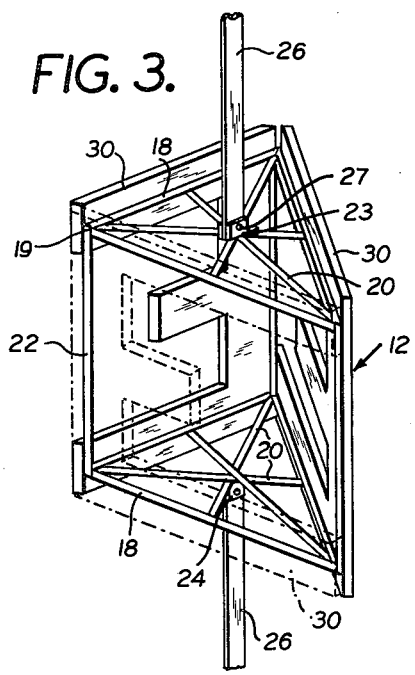
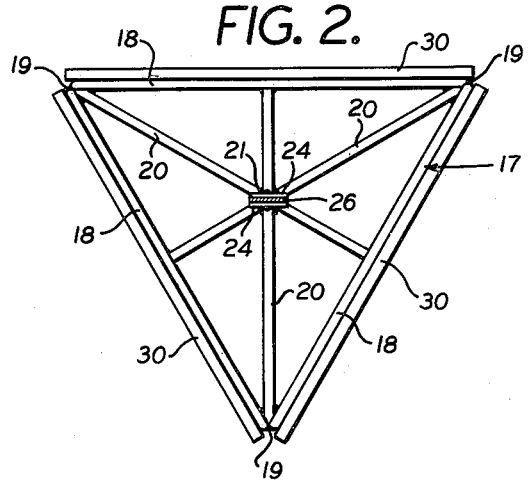
INVENTOR
S. GARNETT GOESLE
BY
ATTORNEYS.

United States Patent Office 2,993,287
Patented July 25, 1961

2,993,287
WIND ANIMATED SIGN
Sylvan Garnett Goesle, New York, N.Y., assignor to Schenley Industries, Inc., New York, N.Y., a corporation of Delaware
Filed Sept. 24, 1959, Ser. No. 841,998
6 Claims. (Cl. 40—37)

The present invention relates generally to improvements in motivated signs, display devices and the like and it relates more particularly to an improved wind actuated sign.

Display and sign devices employing wind actuated mobile display elements have been in wide spread use and are increasing in popularity. The conventional types of wind motivated signs and those which have been heretofore proposed, possess numerous drawbacks and disadvantages. They are often very complex and erratic in their operation depending to a very large extent upon the vagaries, velocity and direction of the wind. Their operation in a heavy wind as well as in a mild breeze is generally unsatisfactory. Furthermore, the visual association of the various mobile elements is often confusing and presents an unattractive appearance. Changes in wind direction likewise adversely affect the operation of these devices. It is thus apparent that the conventional wind actuated sign leaves much to be desired.

It is therefore a principal object of the present invention to provide an improved display device.

Another object of the present invention is to provide an improved wind motivated sign.

Still another object of the present invention is to provide a sign including a plurality of wind actuated mobile display elements.

A further object of the present invention is to provide a sign including a plurality of wind actuated display elements in cooperating visual association.

Still a further object of the present invention is to provide an improved wind actuated sign automatically controlling the degree of movement and operating satisfactorily under various wind conditions.

A further object of the present invention is to provide an improved wind actuated sign in which the degree of movement may be simply and readily adjusted and regulated.

Another object of the present invention is to provide a wind motivated sign of the above nature characterized by its simplicity, ruggedness, low cost and ease of application.

The above and further objects of the present invention will become apparent from a reading of the following description taken in conjunction with the accompanying drawings wherein:

FIG. 1 is a front elevational view of an improved sign embodying the present invention;

FIG. 2 is an enlarged detailed sectional view taken along line 2—2 of FIG. 1; and FIG. 3 is an enlarged perspective view of one of the mobile elements, one of the display members being shown in broken lines for clarity of illustration.

In a sense the present invention contemplates the provision of an improved wind actuated display device comprising a structure including a pair of oppositely disposed support members, a plurality of spaced axially rockable torsion members carried by and between said support members and having their outer ends rigidly secured thereto, and mobile display units mounted on said torsion members intermediate the ends thereof and rockable therewith, said mobile units being provided with wind intercepting surfaces.

In accordance with a preferred form of the present device the support structure comprises a rectangular tubular frame having a pair of oppositely disposed parallel support bars. Each of the mobile units consists of a triangular prismatic wire frame having a longitudinal axis extending perpendicularly to the support bars. Cross pieces are carried by the frame triangular end walls and pass through the centers of these end walls. The torsion members are defined by thin metal bands extending from the frame end face crosspieces along linear extensions of the mobile unit longitiudinal axes and are secured to the support bars and crosspieces. Wind intercepting planar indicia or display members are mounted on the rectangular faces of each of the mobile units.

Referring now to the drawing which illustrates a preferred embodiment of the present invention, the reference number 10 generally designates the improved wind motivated sign which comprises a rectangular support frame or structure 11 and a plurality of mobile display units 12. The support frame 11 is preferably formed of tubular bars or pipes for reasons of rigidity and light weight and includes a pair of upper and lower parallel horizontal bars 13 and vertical parallel side bars 14, the ends or the horizontal and vertical frame bars 13 and 14 being rigidly connected in the conventional manner by elbows 16.

Each of the mobile display units 12 is of substantially triangular prismatic configuration having a vertical longitudinal axis lying in the plane of the support frame 11. The unit 12 includes a skeleton or wire framework having equilateral triangular end faces 17 formed of side rods 18 weld fastened at their ends to define apices 19. Also weld fastened to the apices 19 and extending to the mid points of the opposite side rods 18 to which they are welded are cross pieces or bracing rods 20 which intersect at point 21 lying at the center of the corresponding end face 17. The frame end sections are vertically spaced and parallel to each other and their apices 19 are connected by vertical rods 22 which are welded to the apices 19 and which with the correspondingly coplanar side rods 18 delineate the three vertical rectangular faces of the mobile unit 12.

Secured to the point of intersection 21 of each set of cross pieces 20 is a U-shaped clamp member 23 having outwardly directed jaw plates 24. A torsion member defining band 26 preferably formed of thin spring steel extends co-axially outwardly from the end triangular sections of each of the mobile units 12, the inner end of each band 26 being suitably secured thereto by a rivet 27 passing through the band 26 and jaw plates 24. The outer ends of the torsion bands 26 are in turn engaged and secured to U-shaped clamp members 28 similar in construction to the clamp members 23 and mounted on collars 29 registering with the corresponding support bars 13. It should be noted that the torsion bands 26 are coaxial with the longitudinal axes of the respective mobile units 12 and that each pair of opposite bands 26 are preferably flexed equal amounts. Furthermore, a rectangular face of each mobile member 12 should be forwardly directed and lie in a vertical plane when the supporting torsion bands 26 are unflexed.

In order to impart a rocking motion to the mobile unit 12 about their vertical axes, a wind intercepting member 30 is mounted on each of the mobile members vertical rectangular faces. The wind intercepting member 30 presents a relatively large area and is in the form of a letter W, other indicia or decoration. The indicia 30 are horizontally aligned and suitably desirably spaced and combine to provide any desired message or decorative or eye appealing effect.

The improved sign 10 is suitably mounted where it is exposed to the wind. The individual mobile units 12 are rotated by the wind impinging upon the surfaces 30 to flex and load the corresponding torsion bands 26. Thereafter, the bands 26 untwist to rotate the respective mobile unit in an opposite direction, the momentum of which causes the torsion band to twist and load in an opposite sense. Thus, as a result of the wind, the loading of the torsion bands 26 and the momentum of the rotating units 12, the units 12 effect a rocking motion and a movement of the indicia 30 to present an attractive and eye catching mobile sign. By reasons of the triangular arrangement of the wind intercepting surfaces 30 about the axes of rotation of the respective mobile unit 12, the operation of the improved sign is relatively independent of wind direction. Moreover, the degree of movement of the various elements 12 as a function of the wind may be varied by adjusting the longitudinal tension in the bands 26 as well as their dimensions and configuration. It should be noted that by reason of the greatly increased countertorque of the bands 26 as the elements 12 twist the degree of rotation of the elements, will up to a point, be substantially independent of wind velocity.

While there has been described and illustrated a preferred embodiment of the present invention, it is apparent that numerous alterations and omissions may be made without departing from the spirit thereof. For example, the orientation of the sign 10 and the bands 26 and units 12 may be otherwise than shown. The bands 26 may extend horizontally instead of vertically and the units may be vertically instead of horizontally spaced.

What is claimed is:

1. An improved wind actuated display device comprising a support structure including a pair of oppositely disposed support members, a mobile display unit disposed intermediate said support members and provided with wind intercepting indicia defining surfaces, and a single pair of axially aligned elongate torsion elements respectively secured fast to and extending from opposite ends of said mobile unit to said support members and nonrotatably secured to said support members, said torsion elements serving to support said unit for rotation about the longitudinal axis of said elements under the force of wind on said unit.

2. An improved wind actuated display device comprising a support structure including a pair of oppositely disposed support members, a three dimensional mobile display unit located between said support members and provided with at least three wind intercepting surfaces substantially symmetrically arranged about the longitudinal axis of said unit, and a single pair of resilient axially torsional elements nonrotatably secured to and extending coaxially from opposite ends of said mobile unit to said support members and nonrotatably secured to said support members.

3. An improved wind actuated display device in accordance with claim 2 wherein said mobile unit includes a triangular prismatic wire frame, said torsion elements extending from the triangular end sections of said frame and said wind intercepting surfaces being defined by indicia defining plates mounted in the longitudinal sections of said prismatic wire frame.

4. An improved wind actuated display device comprising a support structure including a pair of spaced parallel support bars, a plurality of regularly spaced mobile display units disposed intermediate said support bars and aligned longitudinally thereof, each of said mobile units including a triangular prismatic frame having a longitudinal axis generally normal to said bars and indicia defining wind intercepting surfaces carried on the longitudinal walls of said frame, the triangular end walls of each frame being provided with a crosspiece intercepting said frame longitudinal axis, and a single pair of torsion bands coaxial with the longitudinal axis of each of said mobile units and having their inner ends secured to said crosspieces and their outer ends secured to said support bars.

5. A display device according to claim 4, said units being spaced medially between said bars, whereby the torsion bands of each pair are substantially equal in length.

6. A display device according to claim 4, said bars being disposed generally horizontally, and each of said units and its torsion bands extending generally vertically.

References Cited in the file of this patent

UNITED STATES PATENTS

| | | |
|---|---|---|
| 624,639 | Frazee | May 9, 1899 |
| 1,535,844 | McLemore | Apr. 28, 1925 |
| 1,635,915 | White | July 12, 1927 |
| 1,642,906 | Suggo | Sept. 20, 1927 |
| 1,674,565 | Peterson | June 19, 1928 |
| 1,821,021 | Moise | Sept. 1, 1931 |
| 2,722,420 | Adamson | Nov. 1, 1955 |

FOREIGN PATENTS

| | | |
|---|---|---|
| 128,993 | Australia | Sept. 2, 1948 |
| 321,180 | Australia | Oct. 30, 1929 |